Oct. 21, 1924.
P. W. FUNCK
1,512,331
MACHINE FOR DISTRIBUTING PLASTIC OBJECTS
Filed Feb. 3, 1922
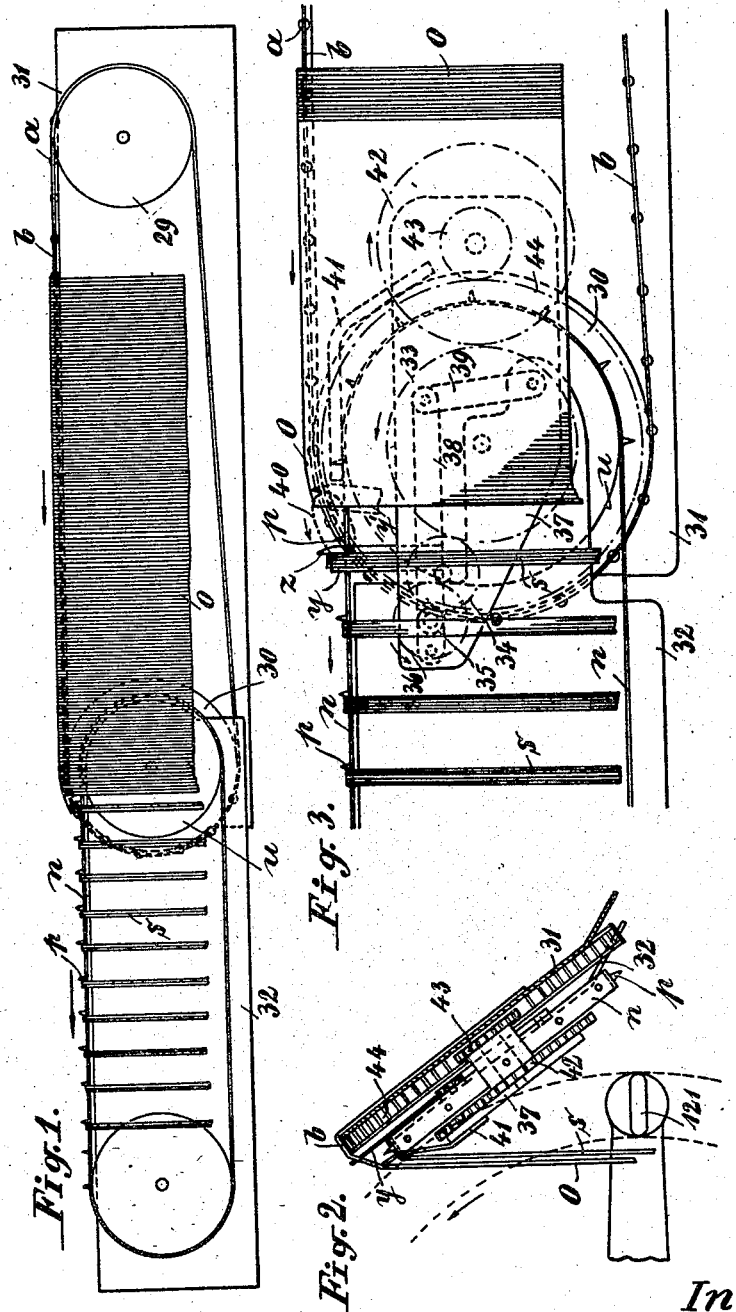
Inventor
Paul W. Funck
by [signature]
Attorney.

Patented Oct. 21, 1924.

1,512,331

UNITED STATES PATENT OFFICE.

PAUL WILHELM FUNCK, OF STUTTGART, GERMANY.

MACHINE FOR DISTRIBUTING PLASTIC OBJECTS.

Application filed February 3, 1922. Serial No. 533,886.

*To all whom it may concern:*

Be it known that I, PAUL WILHELM FUNCK, a citizen of Germany, residing at Stuttgart, Germany, have invented certain new and useful Improvements in Machines for Distributing Plastic Objects, of which the following is a specification.

My invention relates to machines for hanking noodles (macaroni or vermicelli) or other plastic thread-shaped objects. In these machines the question is still undecided whether it be preferable to connect them directly with the presses or cutting machines supplying the threads or to produce the threads separately and to place them into the hanking-machine by hand. It is an object of my invention to provide a machine of this kind which can be used for both methods of operation. This is attained by a special device for supplying and distributing the threads.

In the drawings affixed to this specification and forming part thereof a device embodying my invention is illustrated diagrammatically by way of example. In the drawings—

Fig. 1 is a side elevation and

Fig. 2 an end elevation of the device.

Fig. 3 is a side elevation of the central portion of the device drawn to a larger scale.

Referring to the drawings, the novel device comprises a slowly moving endless band conveyer $b$ receiving the plastic threads $o$ supplied to the machine which are in close vicinity to one another, and a more rapidly moving endless band conveyer $n$ whose teeth $p$ remove the threads in bundles $s$ from the slowly moving conveyer $b$ and carry them to the hanking device proper, for instance to a revolving rod 121, which lifts a predetermined number of bundles $s$ off the conveyer $b$, as illustrated in Fig. 2. The slowly moving conveyer $b$ is provided with low projections $a$ for carrying along the threads and is guided over pulleys 29, 30, which are arranged beneath an inclined plate or board 31. The threads $o$ are placed on this plate or board in immediate vicinity to one another by hand or by special devices in such a manner that one half of each thread slides on the plate or board 31 while the other half is hanging freely down over the edge of the conveyer $b$. The upper action portion of conveyer $b$ is supported by the upper edge of the plate or board 31 and carries the noodles. In contradistinction thereto the lower returning portion of conveyer $b$ does not act on the depending noodles $o$ nor on the noodles carried along across the plate or board 31, the sheaves 29, 30 for this conveyer being arranged to turn in an inclined plane and the plate or board 31 completely covering the lower portion of the conveyer. The pulley $u$ which supports the more rapidly moving conveyer $n$ is arranged beneath the slowly moving conveyer $b$, preferably on the same spindle as the somewhat larger pulley 30 of the latter, both pulleys being free to turn on said spindle. The active portions of the slower moving conveyer $b$ and the faster moving conveyer $n$, if viewed in the direction of the axes of their sheaves, cross each other. Where the conveyers are crossing, all the threads arriving on the upper portion of the conveyer $b$ and the plate or board 31 pass on to the lower conveyer $n$ and the lower sliding plate or board 32, each tooth $p$ of the conveyer $n$ engaging about the same number of threads. In order to cause the noodles to pass from the slower moving conveyer $b$ onto the faster moving conveyer $n$, the sheaves 30 and $u$ need not be disposed side by side nor strictly in parallel to one another. It is, however, important that the upper active portion of one of the two conveyers form the continuation of the upper active portion of the other conveyer. This will be the case whenever these active portions extend partly alongside of each other. If this is the case, provision must further be made that the threads $o$ depending from the slower moving conveyer $b$ be caught by the teeth $p$ of the faster moving conveyer $n$. This is provided for in the most perfect manner by disposing the active portion of the slower moving conveyer $b$ at a slightly higher level than the corresponding portion of the conveyer $n$ and by disposing the active and inactive portions of conveyer $b$ in a plane which is inclined with relation to the vertical in such an extent that the noodles $o$, as shown in Figure 2, extend across the conveyer $n$. This latter conveyer must be disposed in an inclined plane in order to allow the noodles $s$, as shown in Figure 2, to be lifted off the conveyer $n$ by the revolving rod 121, in order to be deposited in the storing device.

In order to provide that each tooth $p$ engages an equal number of threads, I prefer arranging a special separating finger $y$, as illustrated in Figs. 2 and 3, this finger being moved to and fro in the interstice between the conveyers $b$ and $n$ and distributing a predetermined number of threads to each tooth $p$.

The finger $y$ is operated from the supporting pulley $u$ of the more rapidly moving conveyer $n$ by means of a gear wheel 33, a pinion 34 and a gear wheel 35 with which a crank disc 36 is connected. All the gear wheels are free to turn on their respective pins which are secured to a base plate 37 arranged at an angle to the machine frame. The crank disc 36 actuates a rod 38 which is pivoted to the plate 32 by a link 39. The rear ends of the threads slide on this plate when the threads are engaged by the teeth $p$. The finger $y$ is a flat spring secured at right angles to the rod 38 whose upper end forms a point $z$ and a recess in which a bundle $s$ may be held. The edge point of the recess moves in an elliptical path 40 in the direction of the arrow so that at each revolution of the crank disc 36 the finger $y$, when in the position $y'$ shown in dotted lines in Fig. 3, separates a bundle from the mass of threads $o$ and delivers it to a tooth $p$ of the conveyer $n$ which is passing at the moment, as soon as the finger $y$ has moved past the position shown in full lines in Fig. 3. As the conveyer $n$, moves further, the bundle is separated entirely from the following threads. A lateral tongue 41 secured to the base plate of the machine prevents a direct separation of the threads by the teeth $p$ which would not be in exact synchronism with the separation by the finger $y$.

The weight of the bundles $s$ thus separated is determined by the velocity at which the pulley 30 of the slowly moving conveyer $b$ is revolving, provided that the relative position of the densely packed threads $o$ remains unaltered. The pulley 30 is actuated from the rapidly revolving cylinder $u$ by means of a gear wheel 33 and a pair of gear wheels 42, 43 which are positively connected but free to turn on their pivots. The gear wheel 43 meshes with a gear 44 formed by the cylinder 30 of the slowly moving conveyer $b$. When the ratio of the gear wheels 42, 43 is altered, the weight of the bundles $s$ will also be altered.

The gear wheels 33, 42, 43, 44 are preferably so devised, that conveyer $n$ travels four times quicker than conveyer $b$. In consequence thereof each bundle $s$ fills one fourth of the gap between two succeeding teeth. By devising the gear wheels 42, 43, in such manner that conveyer $n$ travels only three times as fast as conveyer $b$, the bundle $s$ will fill the third part of the gap and its weight will therefore be one third higher than the weight of a bundle $s$ in the case first mentioned.

I wish it to be understood that I do not desire to be limited to the exact details of construction shown and described, as obvious modifications will occur to a person skilled in the art.

I claim:

1. In a device of the kind described in combination, two endless band conveyers adapted to travel around inclined axes one forming a continuation of the other, and extending partly alongside thereof, teeth on the second conveyer and means for moving the second conveyer at higher speed than the first one.

2. In a device of the kind described in combination, two endless band conveyers adapted to travel around inclined axes, a guide board extending in parallel to and in close vicinity to one of said conveyers, one forming a continuation of the other conveyer, and extending partly alongside thereof, teeth on the second conveyer and means for moving the second conveyer at higher speed than the first one.

3. In a device of the kind described in combination, two endless band conveyers, one forming a continuation of the other, and extending partly alongside thereof, teeth on the second conveyer, means for moving the second conveyer at higher speed than the first one, a separating finger movably arranged at the point where said conveyers cross one another and means for moving said finger to and fro in the direction of travel of said conveyers.

In testimony whereof I affix my signature.

PAUL WILHELM FUNCK.

Witnesses:
H. R. SOMMERHOFF,
G. FLESCH.